Jan. 19, 1971   W. A. AYRES   3,555,906
CLINICAL THERMOMETER
Filed April 28, 1969

INVENTOR
WALDEMAR A. AYRES
BY
Kane, Dalsimer, Kane, Sullivan & Smith
ATTORNEYS

United States Patent Office 3,555,906
Patented Jan. 19, 1971

3,555,906
CLINICAL THERMOMETER
Waldemar A. Ayres, 401 Park Ave.,
Rutherford, N.J. 07070
Filed Apr. 28, 1969, Ser. No. 819,637
The portion of the term of the patent subsequent to
Sept. 30, 1986, has been disclaimed
Int. Cl. G01k 5/22
U.S. Cl. 73—371                                         11 Claims

ABSTRACT OF THE DISCLOSURE

A maximum reading, constriction-type clinical thermometer, having a thermal responsive liquid medium within its bore and a short section or "slug" of a second liquid medium which is nonmissible with the first liquid. The second liquid is dyed or otherwise provided with a prominent color thereby to provide ease in readability as the second liquid, in contact with and supported by the first liquid, is caused to move in response to a temperature increase sensed by the first liquid. The temperature reading is provided by the column head of the second liquid.

---

Figure 1:
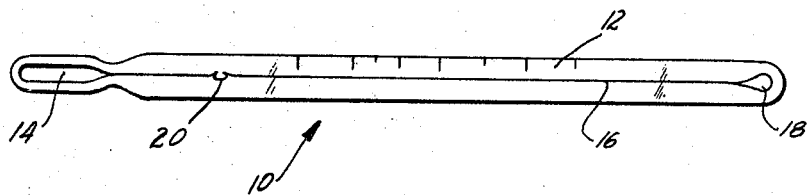

The present invention relates to an improved clinical thermometer of the maximum reading type. More particularly, the improved thermometer is one that includes a second liquid which may be dyed or otherwise provided with prominent color and which rides on the head of the column of the first liquid to provide improved readability.

Clinical thermometers of the maximum reading type are known to the art. Such thermometers are generally of the type that include a stem which terminates at one end in a bulb. The bulb contains a thermally responsive liquid medium which, in response to upward variations in temperature, expands and rises within a column provided in the stem and in communication with the bulb. In the maximum reading thermometer a constriction is usually formed in the column, near the bulb, so that the contained thermal medium necessarily must pass through the same under the influence of greater or increasing forces within the bulb due to the rise in temperature thereby to seek an equilibrium position indicative of the temperature.

While thermometers of this type are presently well recognized commercially and, in fact, the standard within the industry, they are not without their drawbacks. In this connection, the maximum reading thermometer contains, as a fluid medium, mercury which, due to its visual characteristics, is difficult to locate within the relatively small stem bore. Thus, there is difficulty in locating the column head so that temperature may be read. This readability or visibility cannot be improved since mercury is not, as far as present knowledge is concerned, capable of being dyed or otherwise provided with a prominent color.

The present invention seeks to overcome the aforementioned disadvantages and in a broad sense is directed to a clinical thermometer of the maximum reading type. The thermometer includes a stem provided with temperature indicia and an internal bore of substantially constant cross-section. The bore extends generally the length of the stem and is disposed substantially in parallel relation with the stem axis throughout its length. A bulb is formed at one end of the stem and is in communication with the bore. A constriction is disposed within the bore, adjacent the bulb. The bulb contains a thermally responsive liquid which, upon increases in internal bulb temperature and pressure, rises in he bore and past the constriction. The thermometer of the invention, further, includes a short section or "slug" of a second nonmissible liquid which is disposed in contact and supported by the head of the thermally responsive liquid column. The second liquid is dyed or otherwise of prominent color to provide ease in readability of a maximum temperature which, as is well known, is maintained by the constriction. As an additional feature of the invention, wetting of the bore surface is obviated due to the liquids being such that they display a greater relative surface tension or energy than the surface energy of the bore surface or, if coated, the bore film surface.

Thus, it is an object of the invention to provide, in a maximum reading constriction-type thermometer, a color indicator at the top of a thermally responsive liquid column to improve the readability of a clinical thermometer of the maximum reading type.

Other objects and advantages of the present invention will become clear to those skilled in the art as the following description, to be read in conjunction with the drawing figures, is developed.

Figure 2:
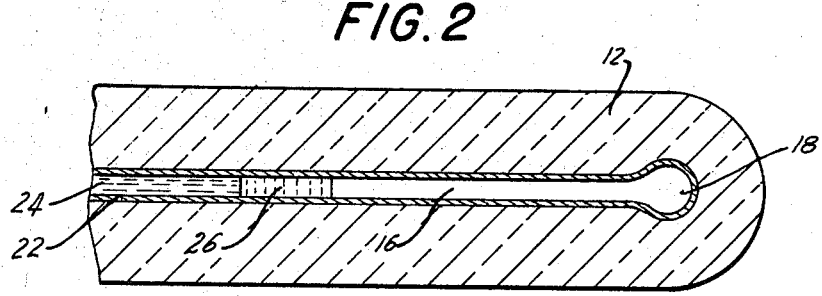
Figure 3:
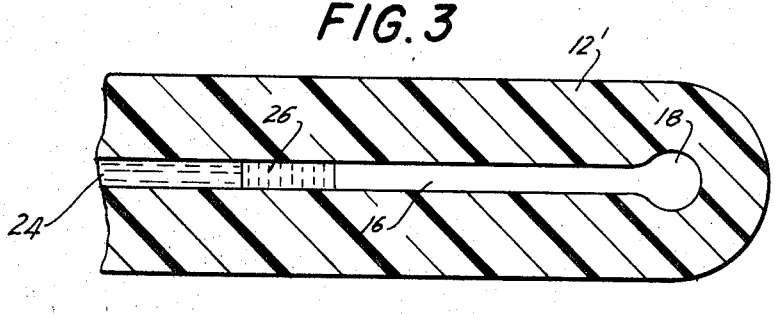

The accompanying drawing illustrates the present invention and forms a part of the present disclosure. By this drawing:

FIG. 1 is a side view of the clinical thermometer of the invention;

FIG. 2 is a greatly enlarged fragmentary view in cross-section shown on form of the clinical thermometer wherein the stem bore is surface-coated to prevent wetting by either the thermally responsive liquid column or the indicator liquid carried at the head of the column; and FIG. 3 is a fragmentary view in cross-section showing a second form of the clinical thermometer wherein the stem bore is not surface-coated.

The improved maximum reading clinical thermometer, generally represented by the number 10, is shown is FIG. 1. The thermometer includes a temperature calibrated glass stem 12 (calibration markings without temperature readings are shown), a bulb 14 at one end of the stem in which the thermal liquid medium is stored and a column or bore 16 which extends throughout substantially the stem length and communicates with the bulb. The column, further, is located in generally parallel relation to the stem axis. Optionally, a chamber 18 is carried at the other end of the bore 16 and functions, if a vapor or gas is used above the thermal liquid column, as a compression chamber to reduce the change of gas or vapor pressure when the column head is at various different heights representative of different temperatures. The thermometer 10, being of the conventional maximum reading type, includes a column construction 20 which is preferably located in close proximity to the bulb.

The manner and method which may be commercially employed to form the column constriction does not fall within bounds of the present invention and, therefore, will not be discussed in any detail. There is the need, however, for a short discussion as to the necessity for and the function of a constriction in a thermometer of the discussed type.

Thus, the constriction permits the passage of liquid medium from the bulb reservoir through the same in response to increased forces within the bulb. These forces are caused by differential expansion between the bulb and the liquid. Upon an increase of the forces experienced, the liquid medium is caused to seek a column level which is maintained by means of the constriction. The level will be maintained even though the sensed temperature falls below the maximum having been recorded. This is because the downward pressure on the column head is insufficient to overcome the surface tension forces of the fluid at the constriction opposing any downward column movement. Rapid shaking of the thermometer is commonly employed to return the medium toward the bulb. The constriction, additionally, in part, functions to prevent downhill slippage or slide-off of the medium (away from the bulb) if the top of the thermometer is tilted in a downward direction. In this connection, although not shown in any detail, the constriction provides gripping surfaces or roots for the column, thereby essentially maintaining stability.

The stem 12, as is conventional, may be formed of glass. However, the invention also contemplates that the stem may be formed of any other materials which are capable of being provided with a column of capillary dimensions and which are sufficiently transparent for ease in readability of the height of the fluid column head determinative of temperature. In this connection, the stem may be formed of a suitable material within the plastic family (FIG. 3).

A surface coating or thin film 22 is provided along the column length and within the chamber 18 in FIG. 2. The need for the coating will become clear as the description continues. For the present purposes, however, and to make it evident that the bore, depending upon the material of the stem, need not be coated, it is to be stated that wetting of the column walls is prevented if the surface tension or energy of the thermal medium and any other contained medium is greater than the surface energy displayed by the bore surface or its film coating.

The coating may or may not be a total coating of the bore throughout its length and including the bulb walls. However, the coating necessarily must be applied to coat the bore within and above the constriction in the FIG. 2 embodiment. The coating and its application will be discussed hereinafter. For the purpose of the present discussion, the coating material is to be one that displays certain surface energy characteristics in the solid or deposited condition. This surface energy will be relatively low in relation to the surface tension or energy of the contained liquid medium. In the FIG. 2 form of the invention, the coating is relatively thin in cross-section and for all purposes may be considered a film which does not significantly decrease the overall cross-sectional dimension of the stem bore 16 which may be approximately 0.003". The film may vary in thickness from a monomolecular layer (or several) to approximately the range of 0.0005". However, and irrespective of the thickness of the film coating, the film must provide a continuous surface whose surface energy is less than the surface energy of the stem material, be it glass or plastic, as discussed.

A thermally responsive liquid medium, only a portion of which is shown, is confined within the column and the bulb of the thermometer 10. The thermally responsive medium may be mercury. The mercury, due to hydrostatic pressure changes within the bulb upon a temperature increase, rises within the bore until its column head locates itself, at equilibrium, at a position which is indicative of the temperature being sensed. This is the maximum temperature. The column head will remain at the maximum level due to constriction.

A second liquid 26 or a "slug" of liquid which is nonmiscible with mercury, capable of being dyed or otherwise provided with a prominent color and having a tension or energy above or appreciably greater than the surface energy of the stem bore or bore coating, is located above and juxtaposed to the mercury. Preferably, although it is not necessary if there is pressurized gas in the thermometer, the second liquid should be a low vapor pressure liquid. Any liquid displaying these characteristics may be employed. A preferred liquid is ethylene glycol. Water, glycerol, formanide, methylene iodide may also be used for the "slug" liquid.

The form of the invention as shown in FIG. 3 is similar to the form of the invention of FIG. 2 except that the stem 12' is formed of plastic and the bore 16 is not provided with a surface coating or film. Thus, the mediums contained within the bore must be such that they display a surface tension or energy which is greater than the surface energy of the bore formed in the plastic stem so that the mediums will not wet their immediately containing surface.

Wetting, as may be well-known, is an inter-surface phenomenon. It is the tendency of a contacting liquid to spread upon or wet a surface whose surface energy is higher than the surface energy or surface tension of that liquid. If the reverse situation is true, no wetting or spreading of the liquid will occur.

The "slug" of liquid 26, as most if not all liquids, is thermally responsive. This characteristics is of no great moment since the second liquid is not in the bulb but rather is confined to the bore area. In this connection, all or substantially all expansion is the result of thermal response in the bulb and the negligible response attributed to the small length medium 26 within the bore will be compensated for by the calibration markings which are applied after the mediums, in the required amount, are introduced to the bore and the thermometer is subjected to final processing. What is necessary, however, is that the "slug" have, among others, the following characteristics: High surface tension or energy relative to the surface energy of the immediately containing surface, whether this surface be the column surface (FIG. 3) or a supporting film (FIG. 2); it should be nontoxic; it should be nonmissible with mercury thereby being capable of riding on top of and in contact with the mercury column head; and, of prime importance, the "slug" must be a liquid capable of being dyed or otherwise provided with prominent color or have its own prominent color so that the readibility of the clinical thermometer is enhanced.

In the general overall manufacture of the thermometer of the present invention, the following is intended to outline the principal steps in a standard production technique that are both well-known to the art and considered appropriate as modified according to the present invention.

Thus, a standard blank which may be of either glass or some other suitable plastic material having a preformed bore of the size discussed and of a length substantially equivalent to the length of two commercial units is, by conventional blowing techniques, provided with a bubble, which during the process receives the bulb or reservoir. This bubble is formed generally within the central area of the blank. Adajacent thereto and on opposed sides of the central bubble, additional bubbles, of relatively smaller cross-section, are similarly created. While the central bubble defines a part of the thermometer bulb the additional bubbles are ultimately acted upon to provide a bore constriction. Once the bubbles have been formed, the total blank is cut in the region of the central bubble.

Coating 22 of the FIG. 2 embodiment may now, or similarly after the constriction is formed, be applied to coat uniformly the column surface of the blank. This coating should be inert to the liquids to be thereafter supplied to the column and which are constantly in contact with the surface.

The coating may be applied to the column surface in the following manner: Initially, air having a high moisture (water) content is blown or otherwise passed along the total column length thereby to substantially uniformly coat the surface with adsorbed molecules of water. Thereafter, vapor of "Dri-Film," an organo-silicon material and a product of the General Electric Company, is uniformly blown through the moisture coated bore of the thermometer blank. The vapor and water react within the blank and along the surface during blowing and the reactant solid forms a substantially continuous and uniform surface having a surface energy which is lower than the surface energy of the glass stem and the surface tension of the to-be-contained liquid mediums.

A bulb is fused on the blank and the unit is treated within a chamber under vacuum for a period of time to evacuate all or substantially all of the air from the bulb and column of the thermometer. For this operation, the individual blanks are usually supported within a pan or other suitable container with the bulb end up. Once evacuation has been completed the first liquid medium 24 is introduced into the bore and bulb. This is easily accomplished by allowing the liquid to pass into and fill the container to a level so that the ends of the blanks are immersed. By increasing the pressure within the chamber the liquid is forced within the bore in an amount to completely fill the bulb and column. In this instance, the first liquid medium 24 which is used is mercury, a material which will enter the bore under increased pressure yet will not wet the column surface, irrespective of whether or not it is coated, since the surface tension of mercury (approximately 485 dynes/cm.) is far greater than the surface energy displayed by either glass or the coating materials contemplated.

Once the blank is filled the thermometer is sealed and provided with a top chamber to accommodate liquid medium in excess of that need for calibration. Then the constriction is formed, as already discussed.

At this point in the procedure, the quantity of mercury within the bulb and bore may be established. In this connection, the thermometer may be introduced into a water bath at a temperature of 106° F. thereby to force the mercury up through the column. A laser may be used to establish the correct amount of mercury in accordance with the teaching in U.S. Pat. No. 3,377,837 which is, similarly, assigned to the assignee of the present invention. Thus, the column of mercury may be split at a point within the central region of the stem (for example, at approximately $3\frac{7}{16}''$ above the bottom of the bulb). Using this dimension, the column will be split approximately $\frac{1}{4}''$ below the point which, in the final product, will become the 106° F. position on the scale. The "slug" 26 will occupy this volume.

After splitting of the column the excess mercury, by a spinning procedure, is forced into the top chamber. The top chamber is conventionally provided on the upper stem in thermometer manufacture.

The top chamber including the excess mercury is removed. Thereafter, by the application of heat, the remaining mercury is expanded to the top of the stem. Generally, this step will follow a step or series of steps during which any entrapped air or gas bubbles will be passed out the open stem end. A large drop of the "slug" liquid is applied to the stem end so as to be in direct contact with the mercury. Thereafter, pressure of sufficient magnitude is applied to force the "slug" liquid down the bore. The mercury will be forced, also, down the bore, some of the mercury passing through the constriction. The bore is again sealed and a new top chamber is formed.

At this point in the process the bulb is again heated by introduction in a water bath at a temperature of 106° F. A second column splitting operation is carried out. Whereas the column was heretofore split at a position of $3\frac{7}{16}''$ from the bulb end, the column is now split at a position of $3\frac{11}{16}''$ from the bulb end. Thus the "slug" will be $\frac{1}{4}''$ in length with the excess "slug" material being spun off into the top chamber which is then removed.

The mercury and "slug" may then undergo a centrifuging operation. When the total column is sufficiently down the bore the thermometer is heated in a 96° F. bath. Establishment of both a 96° F. and a 106° F., the scale length, enables the thermometer to undergo an engraving and etching operation thereby to dispose scale characters and divisions on the stem.

As previously mentioned, the coating 22 may be applied after the constriction, rather than before the constriction, is formed. Thus the constriction may be formed before the blank is sealed and, at this point in the total operation, the bore may be coated, as previously discussed.

It has also been found that the bore of the blank may be coated with other materials which display low surface energy characteristics, i.e., low in relation to the surface tension of the confined liquid medium.

Thus, the bore may be coated with a material known in the trade as "Zepal," a fluorocarbon sold by Du Pont, or other fluorocarbons, as for example, perfluorolauric acid $[F_3C(CF_2)_{10}COOH]$, having a surface energy of only 6 dynes per cm. at 20° C. or any of the polymeric solids, and the fluorocarbon, hydrocarbon, chlorocarbon or nitrated hydrocarbon surfaces as discussed on pages 20 and 21 of "Contact Angle, Wettability, and Adhesion," Advances in Chemistry Series 43, 1964. All of these materials display a surface energy of from 6 to 45 dynes per cm. at 20° C., which is significantly below the surface tension of, for example, water (72.8 dynes/cm. at 20° C.), glycerol (63.4 dynes/cm. at 20° C.), formanide (58.2 dynes/cm. at 20° C.), and methylene iodide (50.8 dynes/cm. at 20° C.). See also pages 317–331 of the aforementioned text, as well as page 27 which suggests that the surface tension of ethylene glycol has a high surface tension in the range of water and methylene iodide.

"Zepal" may be blown through the column bore in quantities sufficient to provide a uniformly coated bore surface throughout. Similarly, the bore may be coated by blowing or otherwise passing a microcrystalline wax-like substance dissolved in a carrier, such as carbon tetrachloride, etc., through the bore to form a continuous low surface energy coating once the carrier is allowed to evaporate. As used herein, "low" means a surface energy which is lower than the surface tension of the confined fluid medium.

Having described the invention, I claim:

1. An improved reading clinical thermometer for maximum temperature indications comprising a capillary tube adapted to receive temperature indicia and having a substantially constant cross-sectional bore extending substantially the length of and generally parallel to the axis of said tube; a bulb forming a reservoir for a quantity of mercury, said bulb being formed at one end of said tube and in communication with said bore thereby upon temperature increases said mercury rises within the bore and past the hereinafter defined constriction thereby to seek an equilibrium level, a constriction in said bore adjacent said bulb, and a relatively short nonmetallic, nonmiscible liquid medium section in fluid contact with the top of the mercury column and capable of movement as a consequence of the rising mercury thereby to form an integral column which is maintained by the constriction so that the head of the section indicates said maximum temperature, said bore surface defined by a material forming a continuous film-like coating having a surface energy which is less than the surface tension of said nonmetallic, nonmiscible liquid medium section to prevent wetting of the treated bore surface by the same, and said nonmetallic, nonmiscible liquid medium section having added thereto dye color to provide enhanced visual contrast with said capillary tube.

2. The improved reading clinical thermometer of claim 1 wherein the nonmetallic, nonmiscible liquid medium section is ethylene glycol.

3. The improved reading clinical thermometer of claim 1 wherein the nonmetallic, nonmiscible liquid medium section is water.

4. The improved reading clinical thermometer of claim 1 wherein the nonmetallic, nonmiscible liquid medium section is glycerol.

5. The improved reading clinical thermometer of claim 1 wherein the nonmetallic, nonmiscible liquid medium section is formanide.

6. The improved reading clinical thermometer of claim 1 wherein the nonmetallic, nonmiscible liquid medium section is methyleneiodide.

7. The improved reading clinical thermometer of claim 1 wherein said film-like coating is formed of a wax-like material.

8. The improved reading clinical thermometer of claim 1 wherein said film-like coating is formed of an organosilicon material.

9. The improved reading clinical thermometer of claim 1 wherein said containing surface is fluorocarbon film.

10. The improved reading clinical thermometer of claim 1 wherein said containing surface is a chlorocarbon film.

11. The improved reading clinical thermometer of claim 1 wherein said containing surface is a nitrated hydrocarbon film.

References Cited
UNITED STATES PATENTS

| | | | |
|---|---|---|---|
| 1,014,800 | 1/1912 | Balderston | 73—371 |
| 3,469,452 | 9/1969 | Ayres | 73—371 |

LOUIS R. PRINCE, Primary Examiner

W. A. HENRY II, Assistant Examiner